United States Patent [19]
Larsen et al.

[11] Patent Number: 5,910,889
[45] Date of Patent: Jun. 8, 1999

[54] HYBRID ACTIVE POWER FILTER WITH PROGRAMMED IMPEDANCE CHARACTERISTICS

[75] Inventors: Einar Larsen, Charlton; Robert Delmerico, Clifton Park, both of N.Y.

[73] Assignee: General Electric Company, Schenectady, N.Y.

[21] Appl. No.: 08/864,999

[22] Filed: May 29, 1997

Related U.S. Application Data

[63] Continuation-in-part of application No. 08/756,871, Nov. 26, 1996, Pat. No. 5,737,198.

[51] Int. Cl.$^6$ ............................................. H02M 1/12
[52] U.S. Cl. ........................ 363/40; 327/552; 307/105
[58] Field of Search .................... 363/40, 41, 39; 307/105, 106; 327/532, 552; 318/629

[56] References Cited

U.S. PATENT DOCUMENTS

| | | | |
|---|---|---|---|
| 3,849,677 | 11/1974 | Stacey et al. | 307/295 |
| 5,465,203 | 11/1995 | Bhattacharya et al. | 363/40 |
| 5,567,994 | 10/1996 | Davis et al. | 307/105 |

*Primary Examiner*—Adolf Deneke Berhane
*Attorney, Agent, or Firm*—Cantor Colburn LLP; Carl B. Horton

[57] ABSTRACT

A hybrid active power filter having programmed impedance characteristics is presented. In accordance with which, a passive device comprising a capacitor $C_F$ is connected in series with an active device which are together connected in shunt with a power source and a load at transmission lines of a power system. Capacitor $C_F$ substantially supports the full-line voltage $V_H$ of the power source, whereby the active filter is exposed to a substantially lower voltage than the line voltage $V_H$. The active device includes on active filter, i.e., an inverter current regulator with a programmable controller for executing a control algorithm. The controller of the active device receives signals corresponding to a voltage $V_M$, at the low side of filter capacitor $C_F$. Voltage $V_M$ is at a substantially lower voltage than the line voltage $V_H$, whereby the cost of sensing voltage $V_M$ is significantly less than sensing the high line voltage V. The control algorithm of the present invention is expressed as $$I_A = Y_{FAo} V_M,$$

where $I_A$ is the current in the active device and $Y_{FAo}$ is an order transfer function of the effective admittance of the active device. $Y_{FAo}$ is a continuous function which is defined to provide a low impedance path at desired frequencies. Accordingly, the control algorithm controls the current $I_A$ in response to voltage $V_M$ sensed at the low side of filter capacitor $C_F$ as dictated by the programmed function. The active device may be connected to the passive filter at a junction between two capacitors or at a junction between two inductors.

10 Claims, 3 Drawing Sheets

HYBRID ACTIVE POWER FILTER WITH PROGRAMMED IMPEDANCE CHARACTERISTICS

CROSS-REFERENCE TO RELATED APPLICATIONS

This application is a continuation-in-part of U.S. patent application Ser. No. 08/756,871 filed Nov. 26, 1996, now U.S. Pat. No. 5,737,198.

BACKGROUND OF THE INVENTION

The present invention relates to hybrid active power filters. More specifically, the present invention relates to hybrid active power filters having programmed impedance characteristics for improved filtering effectiveness.

A hybrid active filter is a combination of a passive filter and an active filter. Such filters are well suited for use in reducing harmonic distortion in power systems which may result from a variety of industrial and power system equipment, e.g., high-voltage direct-current (HVDC) power transmission systems and motor speed controllers. This harmonic distortion is undesirable as it is often the source of telephone interference (i.e., the distortion signal is coupled onto the telephone lines running along side of the power lines), excessive heating of electrical equipment on the power system and other distortion related problems.

Passive filters were originally employed to filter the harmonic distortion in power systems, whereby a passive filter was connected in parallel with the load or harmonic source on the system to provide a low impedance path for removing the distortion currents. With the recent availability of high power inverters, active filters have been considered for filtering the harmonic distortion in power systems. In prior art active filter systems, distortion currents are measured on power system and are used for controlling the active filter. Typically, the active filter includes a power electronic converter that either supplies or draws distortion currents to remove distortion currents from the power system.

Parallel combinations of shunt connected active and passive filters are known. see, e.g. a paper entitled "New Trends in Active Filters for Improving Power Quality", by Hirofumi Akagi, IPCC-95-59 ("Akagi paper"). Harmonic reduction is achieved by measuring load current and injecting a compensating current, thereby resulting in a corresponding reduction in source current harmonics.

Combinations of a shunt connected passive filter with an active filter in series with the power source are also known, see, e.g., Akagi paper. Harmonic reduction in these combinations is achieved by measuring source load voltage and current on the power, system, and injecting a compensating voltage in series with the source, thereby isolating load bus harmonics from the source.

Series combinations of active and passive filters connected in shunt with the power system are known, see, e.g., Akagi paper. Harmonics reduction is achieved by measuring power system source current and driving a compensating voltage in series with the passive filter, thereby diverting load harmonics into the passive filter.

Combinations of an active filter connected to inject a current in parallel with one or more elements of a passive filter are known, see, e.g., U.S. Pat. No. 3,849,677 entitled "Hybrid Power Filters Employing Both Active and Passive Elements". Harmonic reduction is achieved by measuring source current or voltage on the power system and driving the compensation current in parallel with the passive filter, thereby diverting load harmonics into the passive filter.

U.S. Pat. No. 5,548,165 entitled "Hybrid Filter for Reducing Distortion in a Power System" discloses a hybrid filter for reducing distortion in a power system. The power system includes a voltage source connected to a load through power lines. An inductor which has a low impedance at the fundamental frequency of the power system and a high impedance at other frequencies is connected to a capacitor which has a high impedance at the fundamental frequency and a low impedance at other frequencies. An active filter is connected in parallel with the inductor. The voltage rating of the active filter at the fundamental frequency is significantly reduced as compared to applying the active filter alone. However, the series connection of the inductor and capacitor may interact with the impedance of the power system, possibly resulting in a series-resonance or a parallel-resonance condition. In order to prevent such resonance, the active filter is operated to provide damping at the resonant frequency in addition to supplying the required distortion current. The active filter provides damping by simulating resistance at the resonant frequency. Specifically, the active filter is operated to draw a current component in phase with the voltage at the resonant frequency. This requires that the active filter draw a small amount of real power from the power system at the resonant frequency. The active filter absorbs this power on the DC side of the active filter. Power for the DC side is supplied from a separate source.

A controller controls the active filter. The controller receives signals proportional to the power system voltage across the load and the voltage across the active filter from potential transformers. A signal proportional to power system current drawn by the load is provided by a current transformer, while a second current transformer provides a signal proportional to the current drawn and supplied by the active filter. Accordingly, the active filter is operated such that it draws a distortion current component which causes all of the load distortion current to flow through the capacitor. Thus, no distortion current flows through the voltage source. Also, the active filter draws a current in phase with the voltage across it to damp any resonance condition.

It will be appreciated that all of the above discussed active filters employ a power system line level reference (i.e., sensed current and/or voltage at the load and/or source of the power system) for closed-loop control. A disadvantage of sensing current and/or voltage at the load and/or source of a power system is that devices for sensing such are exposed to the full-line voltage and/or current of the power system, whereby expensive, high power rated sensing devices are required. Also, logistical problems can arise with respect to the physical distance between and/or the location of the active filter's control device and the required sensing devices. Moreover. employing closed-loop control at the power system line will likely result in control instabilities when modifications are made to the power system itself. Another disadvantage of the aforementioned prior art is the problem of regulating current between multiple active filters, each sensing the same power system line. In such a configuration, each active filter will be trying to compensate for the other.

SUMMARY OF THE INVENTION

The above-discussed and other drawbacks and deficiencies of the prior art are overcome or alleviated by the hybrid active power filter having programmed impedance characteristics of the present invention. In accordance with the present invention, a passive device comprising a capacitor $C_F$ is connected in series with an active device which are together connected in shunt with a power source and a load through transmission lines of a power system. Capacitor $C_F$ substantially supports the full-line voltage $V_H$ of the power source at fundamental frequencies, whereby the active device is exposed to a substantially lower voltage than the line voltage $V_H$. The active device includes an active filter, e.g., an inverter current regulator with a programmable controller for executing a control algorithm. The controller of the active device receives signals corresponding to a voltage $V_M$, at the low side of filter capacitor $C_F$. Voltage $V_M$ is at a substantially lower voltage than the line voltage $V_M$, as described above, whereby the cost of sensing voltage $V_M$ is significantly less than sensing the high line voltage $V_H$.

The control algorithm of the present invention is expressed as $$I_A = Y_{FAoV_M},$$

where $I_A$ is the current in the active device and $Y_{FAo}$ is an order transfer function of the effective admittance of the active device. $Y_{FAo}$ is a continuous function which is defined to provide a low impedance (high admittance) path, seen from the power system, at desired frequencies for improving filter effectiveness, whereby the current $I_A$ is generally 900 out of phase with the voltage $V_M$ at the desired frequencies. Accordingly, the control algorithm controls the current $I_A$ in response to voltage $V_M$ sensed at the low side of filter capacitor $C_F$ as dictated by the programmed function. This is in distinct contrast to the prior art, wherein active filter control was in response to voltage or current sensed at the high side of the source or load. In further contrast with the prior art, the current $I_A$ is substantially out of phase with the voltage $V_M$ at the desired frequencies.

The hybrid active filter of the present invention senses a line of hybrid active filter. i.e., a non-power system line, for closed-loop control, whereby the voltage sensing device is not exposed to full-line voltage and/or current of the power system. Thus, allowing significantly less expensive, lower voltage rated sensing devices to be used. The prior art logistical problems with respect to the physical distance between and/or the location of the active filter's control device and the voltage sensing device are not present, as these are always in close proximity to each other. Further, since closed-loop control is not employed at the power system line, control instabilities are not likely to arise when modifications are made to the power system. Also, regulating current between multiple hybrid active filters of the present invention is not a problem, as each senses voltage and seeks to control current within the filter and not at a common power system line.

The above-discussed and other features and advantages of the present invention will be appreciated and understood by those skilled in the art from the following detailed description and drawings.

BRIEF DESCRIPTION OF THE DRAWING

Referring now to the drawings wherein like elements are numbered alike in the several FIGURES.

DESCRIPTION OF THE PREFERRED EMBODIMENT

Figure 1:
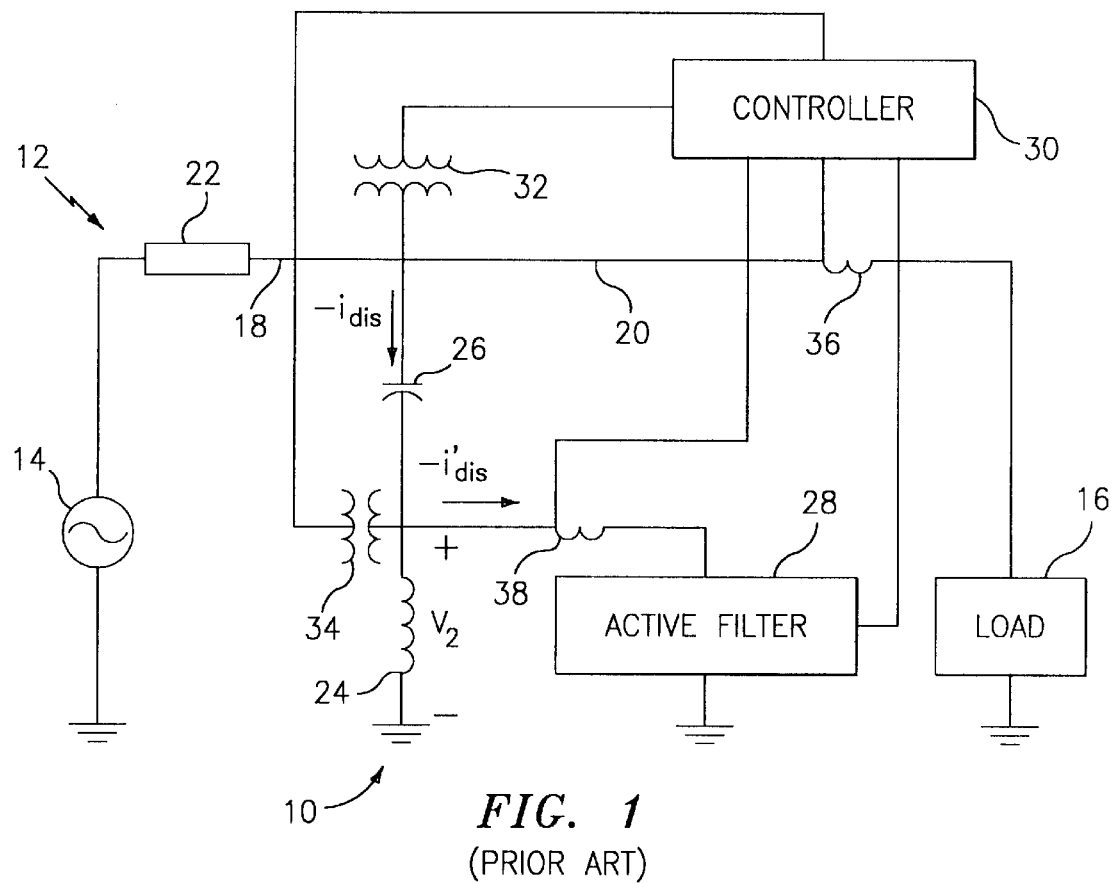
FIG. 1 is a schematic diagram of a hybrid filter in accordance with the prior art.

Referring first to prior art FIG. 1, a hybrid active filter 10 for reducing distortion in a power system 12 as disclosed in aforementioned U.S. Pat. No. 5,548,165 is generally shown. Power system 12 includes a voltage source 14 connected to a load 16 through lines 18 and 20. Line 18 includes an impedance element 22 which models the impedance of power system 12 looking toward voltage source 14. An inductor 24 which has a low impedance at the fundamental frequency of the power system and a high impedance at other frequencies is connected to a capacitor 26 which has a high impedance at the fundamental frequency and a low impedance at other frequencies. An active filter 28 is connected in parallel with inductor 24. The voltage rating of active filter 28 at the fundamental frequency is significantly reduced. However, the series connection of inductor 24 and capacitor 26 may interact with impedance element 22 of power system 12, possibly resulting in a series-resonance or a parallel-resonance condition. In order to prevent such resonance. active filter 28 is operated to provide damping at the resonant frequency in addition to supplying the required distortion current $i_{dis}$. Active filter 28 provides damping by simulating resistance at the resonant frequency. Specifically, active filter 28 is operated to draw a current component in phase with the voltage $v_2$ at the resonant frequency. This requires that active filter 28 be able to draw a small amount of real power from power system 12 at the resonant frequency. Active filter 28 is designed to be able to absorb this power on the DC side (not shown) of active filter 28.

A controller 30 controls active filter 28. Controller 30 receives signals proportional to the voltage across load 16 and the voltage across active filter 28 from potential transformers 32 and 34, respectively. A signal proportional to current drawn by load 16 is provided by a current transformer 36, while a current transformer 38 provides a signal proportional to the current drawn and supplied by active filter 28.

Accordingly, active filter 28 is operated such that it draws a distortion current component $(-i'_{dis})$ which causes all of the load distortion current $(i_{dis})$ to flow through capacitor 26. Thus, no distortion current flows through voltage source 14. Also, active filter 28 draws a current $(v_2/R)$ in phase with the $v_2$ across it to damp any resonance condition.

Hybrid active filter 10 suffers from the aforementioned prior art deficiencies: (1) hybrid active filter 10 senses power system line 20 (i.e., sensed current and voltage at the load the power system) for closed-loop control; (2) potential and current transformers 32 and 36 are exposed to full-line voltage and current of the power system, whereby expensive, high power rated sensing devices are required; (3) logistical problems can arise with respect to the physical distance between and/or the location of the active filter's control device 30 and potential and current transformers 32 and 36; (4) employing closed-loop control at the power system line will likely result in control instabilities when modifications are made to the power system itself; and (5) regulating current between multiple such hybrid active filters 10, each sensing the same power system line, will likely be a problem.

Figure 2:
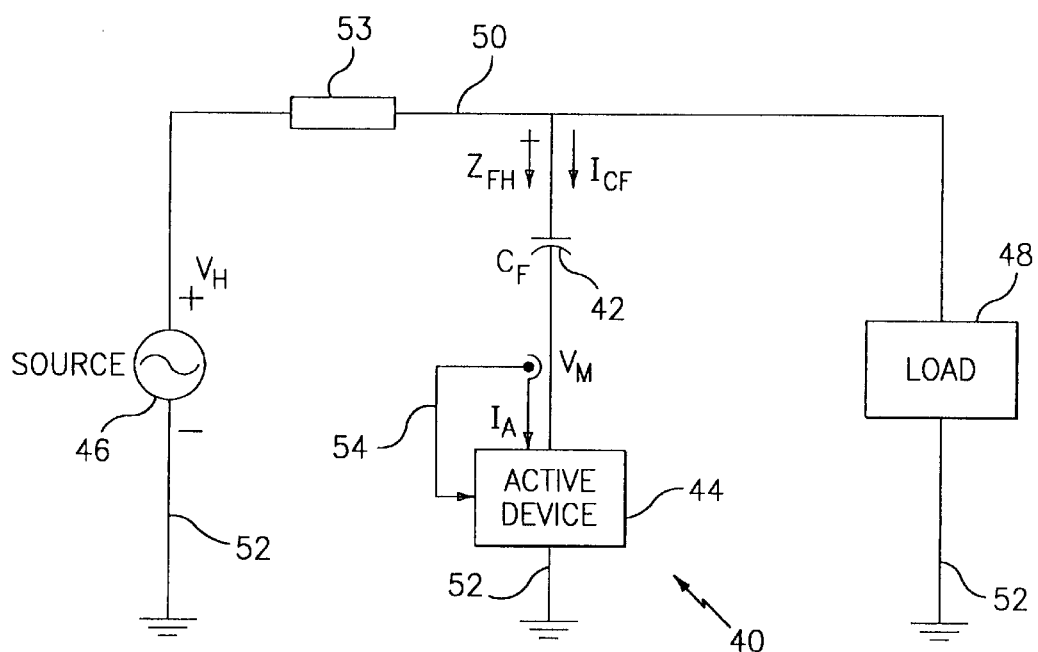
FIG. 2 is a schematic diagram of a hybrid active power filter having programmed impedance characteristics in accordance with the present invention.

Referring to now FIG. 2, a hybrid active power filter 40 having programmed impedance characteristics in accordance with the present invention is generally shown. A passive device comprising a capacitor 42, designated $C_F$, is connected in series with an active device 44. The series connection of capacitor $C_F$ and active device 44 are together connect in shunt with a power source 46 and a load 48 at transmission lines 50 and 52 (i.e., a power system). Impedance element 53 is indicative of the impedance of the power system looking toward source 46. Capacitor $C_F$ substantially supports most or all of the fundamental frequency component of line voltage $V_H$ of source 46, whereby active device 44 is exposed to a substantially lower voltage than the line voltage $V_H$. Active device 44 comprises an active filter alone or an active filter in combination with at least one passive filter device, as is described in more detail hereinafter. The active filter preferably comprises a pulse-width modulated (PWM) inverter current regulator and a programmable controller for executing a control algorithm. The controller of active device 44 receives signals corresponding to a voltage, designated $V_M$, at the low side of filter capacitor $C_F$ at a line 54. Voltage $V_M$ is at a substantially lower voltage than the line voltage $V_H$, as described above, whereby the cost of sensing voltage $V_M$ is significantly less than no sensing the high line voltage $V_H$.

Applying basic network theory to the circuit of FIG. 2, the impedance of capacitor $C_F$ is expressed as, $$Z_{CF} = \frac{1}{sC_F}. \tag{1}$$

The impedance into the hybrid filter circuit $Z_{FH}$ is expressed as $$Z_{FH} = \frac{V_H}{I_{CF}} \tag{2}$$

where $I_{CF}$ is the current in the passive device (filter capacitor $C_F$) The effective admittance of the active device is expressed as, $$Y_{FA} = \frac{I_A}{V_M} \tag{3}$$

where $I_A$ is the current in active device 44. Further, from circuit relationships $$Z_{FH} = Z_{CF} + \frac{1}{Y_{FA}} \tag{4}$$

and solving Eq. 4 for $Y_{FAo}$, an ordered value for $Y_{FA}$, results in $$Y_{FAo} = \frac{1}{(Z_{FHo} - Z_{CF})}. \tag{5}$$

where $Z_{FHo}$ is an ordered value for $Z_{FH}$.

Figure 3:
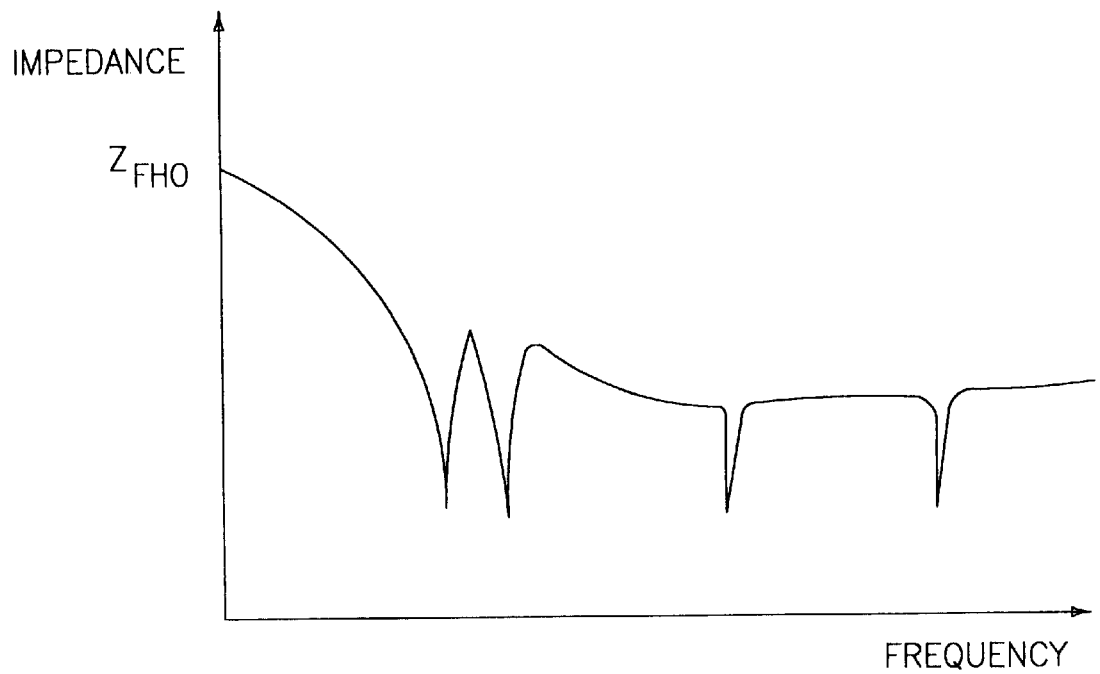
FIG. 3 is an exemplary plot of impedance versus frequency for an ordered value of the hybrid active power filter of FIG. 2.

Referring to FIG. 3, $Z_{FH}$ is a programmed continuous function of impedance versus frequency, with the impedance being low at the frequencies where highest filtering effect is desired, e.g., at the 11th, 13th, 23rd and 25th harmonic. The impedance for the passive elements are known.

Accordingly, the control algorithm of the present invention is expressed as:

$$I_A = Y_{FAo} v_M \tag{6}$$

wherein the current $I_A$ is controlled in response to voltage $V_M$ sensed at the low side of filter capacitor $C_F$ as dictated by the programmed impedance function.

Figure 4:
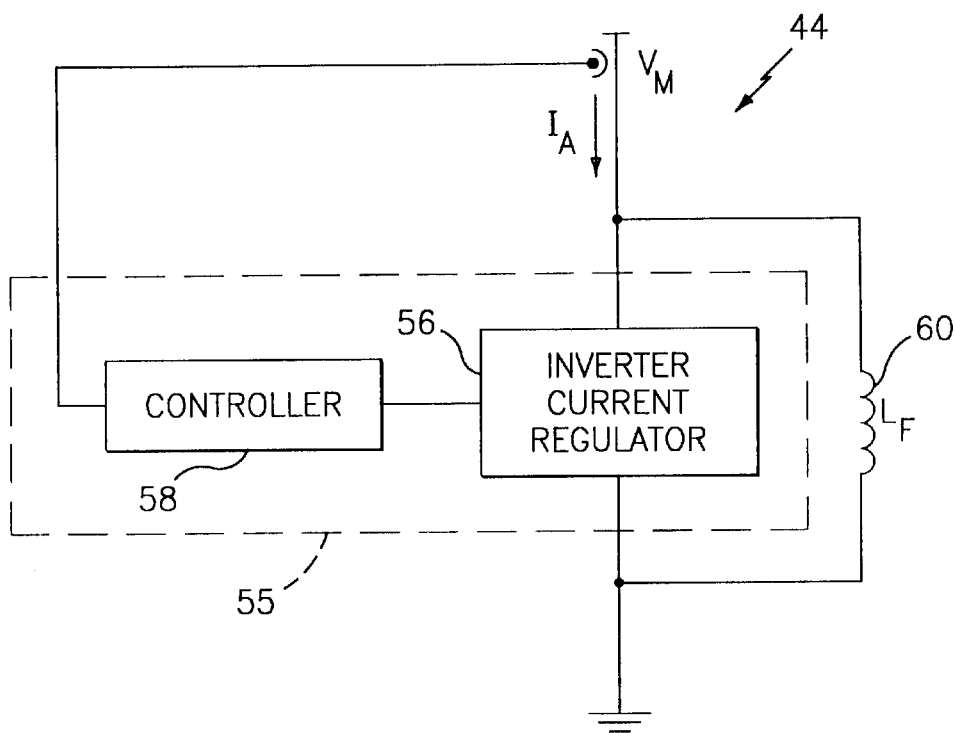
FIG. 4 is a schematic diagram of the active device of the hybrid active power filter of FIG. 2.

Referring to FIG. 4, active device 44 may comprise an active filter 55 (e.g., an inverter current regulator 56 and controller 58) connected in parallel with at least one passive filter device, such as in the present example an inductor 60 designated $L_F$. However, more complex passive filter networks may be employed. In the active device configuration of FIG. 2, inductor $L_F$ is also connected in series with capacitor $C_F$. Capacitor $C_F$ and inductor $L_F$ form a series resonant circuit tuned to a selected frequency. In this embodiment, controller 58 receives signals corresponding to a voltage, designated $V_M$, at the midpoint of capacitor $C_F$ and inductor $L_F$ at line 54. For example, with inductor $L_F$, the transfer function $Y_{FAo}$ would then be expressed as:

$$Y_{FAo} = \frac{1}{(Z_{FHo} - Z_{CF})} - Y_{FM} \tag{7}$$

$$Y_{FM} = \frac{1}{Z_{FM}} = \frac{1}{sL_F}.$$

where $$I_A = Y_{FAo} v_M .$$

The control algorithm remains as set forth above, i.e., $Y_{FAo}$ is a transfer function which may have significant dynamic character. There may be some error in establishing the ordered value $Y_{FAo}$. However, methods for compensating this error are well known, e.g., adding a series compensating transfer function to trim the system over a desired frequency range. Also, to prevent active device 44 from drawing current at certain frequencies, such as the fundamental frequency of an a.c. power system, a notch filter may be included in the control algorithm, Eq. 6, thereby preventing a response at the selected frequency but retaining the desired response for frequencies beyond the bandwidth of the notch filter.

Inverter 56 may alternatively comprise an inverter voltage regulator, whereby the control algorithm would be expressed as:

$$V_M = \frac{I_A}{Y_{FAo}} \tag{8}$$

Referring again to FIG. 2, power system signals are present at source 46 and load 48 on transmission lines 50 and 52. All of the aforementioned prior art active (hybrid) filters sense voltage and/or current at the source and/or load on these transmission lines for filter control. In other words, the prior art active (hybrid) filters sense power system signals for filter control. This is in distinct contrast to the hybrid active filter of the present invention which does not sense any power system signals for filter control.

The passive devices (filters) employed by the present invention predominately comprise inductive and capacitive components which cause the current $I_A$ to be generally 900 out of phase with the voltage $V_M$ at desired frequencies, thereby resulting in the low impedance (high admittance) path, as seen from the power system, discussed hereinbefore.

Hybrid active filter 40 overcomes the aforementioned prior art deficiencies: (1) hybrid active filter 40 senses a line of hybrid active filter 40, i.e., a non-power system line, for closed-loop control; (2) the voltage sensor is not exposed to full-line voltage and/or current of the power system, whereby significantly less expensive, lower voltage rated sensing devices are used; (3) logistical problems cannot arise with respect to the physical distance between and/or the location of the active filter's control device and the voltage sensor as they are always in close proximity to each other; (4) closed-loop control is not employed at the power system line, whereby control instabilities are not likely when modifications are made to the power system itself; and (5) regulating current between multiple hybrid active filters 40 is not a problem, as each senses voltage and seeks to control current within the filter and not at a common power system line.

Figure 5:
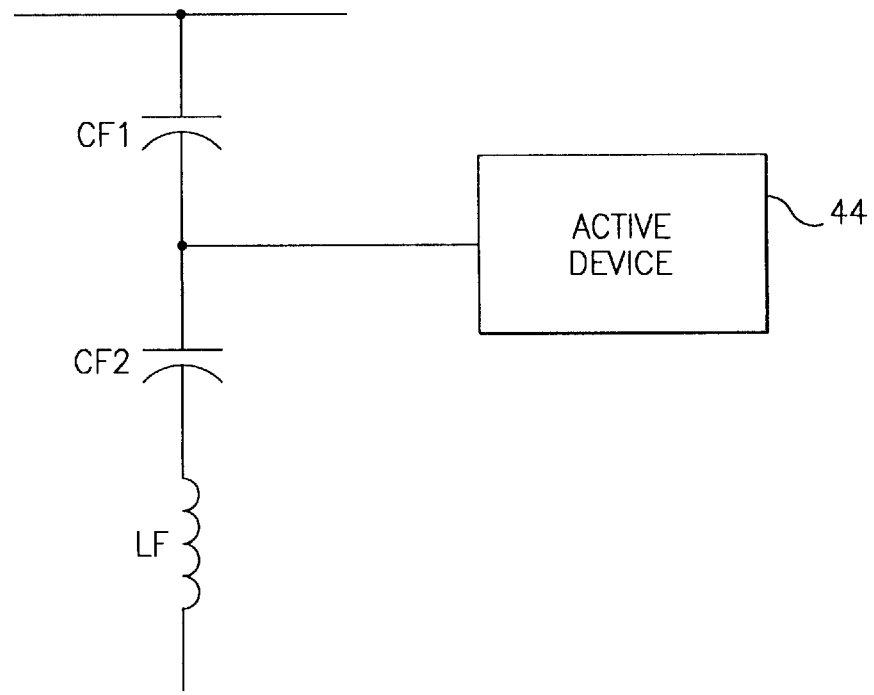
FIG. 5 is a schematic diagram of an alternative design for coupling the active filter to the passive filter.

FIG. 5 is a schematic diagram of an alternative design for coupling the active device 44 to the passive filter. In the prior art system shown in FIG. 1, the active filter 28 is connected between a capacitor 26 and an inductor 24. As shown in FIG. 5, the conventional capacitor is divided into two capacitors CF1 and CF2 and the active device 44 is connected at the junction of CF1 and CF2. Splitting the capacitor and connecting the active device 44 to the junction between CF1 and CF2 reduces the voltage duty of the active device 44. The design shown in FIG. 5 completely eliminates the fundamental component of the voltage, but does not substantially reduce harmonic voltages.

Figure 6:
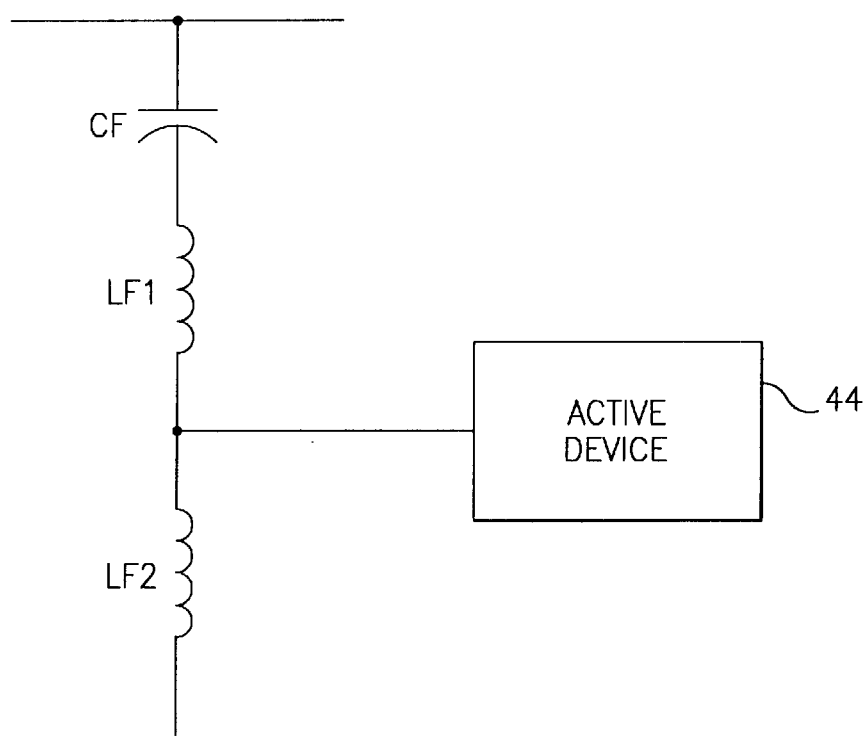
FIG. 6 is a schematic diagram of another alternative design for coupling the active filter to the passive filter.

FIG. 6 is a schematic diagram of another alternative design for coupling the active device 44 to the passive filter. As shown in FIG. 6, the conventional inductor is divided into two inductors LF1 and LF2 and the active device 44 is connected at the junction of LF1 and LF2. This design reduces both the fundamental and harmonic voltage. The configuration of FIG. 6 is particularly useful if the focus of the active device 44 is only a few harmonics above the filter tuned point (e.g. 7, 11, 13 in a 5th harmonic filter), and the dominant impact on rating is the voltage caused by 5th harmonic voltage.

The capacitive tap shown in FIG. 5 and the inductive tap shown in FIG. 6 reduce the power rating of the active device 44. For example, consider a 10MW converter load on a 13.8 kV bus with two types of converter loads; 6-pulse and 12-pulse. For the 12-pulse, the 5th and 7th harmonics are assumed to be reduced to 15% of the 6-pulse values. Providing half of the reactive load in the filter results in a harmonic filter rated for 3MV Ar. The filter is tuned just below 5th harmonic.

The active device 44 will see a complex voltage and current waveshape, consisting of several harmonics. Important aspects of the active device's duty rating are peak voltage and current, and rms current. The peak voltage is used together with the rms current to develop an effective 3-phase rating. The rating requirements for the active device 44 associated with a midpoint tap, as well as the optimum non-midpoint tap are shown in Table I. It is clear from Table I that the use of either the capacitive tap design of FIG. 5 or the inductive tap design of FIG. 6 reduces the power rating of the active device 44 and thus the cost of the device.

TABLE I

Active Device Rating Requirements for 10MW Converter Assuming 3MV Ar Passive Filter Tuned at 4.8 Harmonic

|  | 6-Pulse Midpoint Tap | 6-Pulse Inductive Tap | 12-Pulse Midpoint Tap | 12-Pulse Capacitive Tap |
| --- | --- | --- | --- | --- |
| Peak Volts L-L | 5500 | 4200 | 2300 | 1500 |
| Peak Amps | 150 | 185 | 85 | 87 |
| RMS Amps | 40 | 50 | 28 | 28 |
| 3-Phase KVA | 270 | 255 | 80 | 50 |

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A hybrid active filter for use in a power system, the power system having a source supplying power to a load, comprising:

a passive device including a first component, a second component and a third component; and an active device connected to said passive device at a junction between said first component and said second component, said passive and active devices connected in shunt with the power system.

2. The hybrid active filter of claim 1 wherein said first component and said second component are connected in series.

3. The hybrid active filter of claim 1 wherein said first component, said second component and said third component are connected in series.

4. The hybrid active filter of claim 1 wherein said first component is a capacitor, said second component is a capacitor and said third component is an inductor.

5. The hybrid active filter of claim 1 wherein said first component is an inductor, said second component is an inductor and said third component is a capacitor.

6. The hybrid active filter of claim 1 wherein said first component, said second component and said third component are connected in shunt with the load.

7. The hybrid active filter of claim 4 wherein said second component and said third component are connected in shunt with said active device.

8. The hybrid active filter of claim 5 wherein said first component is connected in shunt with said active device.

9. The hybrid active filter of claim 1 wherein said first component is a capacitor, said second component is an inductor and said third component is a capacitor; said second and third components connected in shunt with said active device.

10. The hybrid active filter of claim 1 wherein said first component is an inductor, said second component is a capacitor and said third component is an inductor; said first component connected in shunt with said active device, and said second and third components connected in series.

\* \* \* \* \*